US012673902B1

(12) United States Patent
Hreha et al.

(10) Patent No.: US 12,673,902 B1
(45) **Date of Patent: *Jul. 7, 2026**

(54) METHOD OF MAKING CARBON-CARBON COMPOSITE

(71) Applicant: Systima Technologies, Inc., Mukilteo, WA (US)

(72) Inventors: Richard D. Hreha, Centerville, OH (US); Katie A. Jensen, Kettering, OH (US); Benjamin A. Dietsch, Kettering, OH (US)

(73) Assignee: Systima Technologies, Inc.

( * ) Notice: Subject to any disclaimer, the term of this patent is extended or adjusted under 35 U.S.C. 154(b) by 0 days.

This patent is subject to a terminal disclaimer.

(21) Appl. No.: 18/814,850

(22) Filed: Aug. 26, 2024

Related U.S. Application Data

(60) Provisional application No. 63/578,831, filed on Aug. 25, 2023.

(51) Int. Cl.

| | |
|---|---|
| ***C04B 35/83*** | (2006.01) |
| ***C04B 35/626*** | (2006.01) |
| ***C04B 35/628*** | (2006.01) |
| ***C04B 35/64*** | (2006.01) |

(52) U.S. Cl.

CPC .......... *C04B 35/83* (2013.01); *C04B 35/6269* (2013.01); *C04B 35/62873* (2013.01); *C04B 35/62886* (2013.01); *C04B 35/62894* (2013.01); *C04B 35/64* (2013.01); *C04B 2235/422* (2013.01); *C04B 2235/48* (2013.01); *C04B 2235/5248* (2013.01); *C04B 2235/5256* (2013.01); *C04B 2235/616* (2013.01); *C04B 2235/656* (2013.01); *C04B 2235/661* (2013.01)

(58) Field of Classification Search

CPC .................................................... C01B 32/205

See application file for complete search history.

(56) References Cited

U.S. PATENT DOCUMENTS

| | | | | |
|---|---|---|---|---|
| 12,077,440 | B1 * | 9/2024 | Hreha | C08J 5/243 |
| 2010/0018815 | A1 * | 1/2010 | Murdie | C04B 35/6264 188/218 XL |

* cited by examiner

*Primary Examiner* — Robert A Vetere

(74) *Attorney, Agent, or Firm* — Dinsmore & Shohl, LLP

(57) ABSTRACT

Methods of making a carbon-carbon composite from thermosetting polymer resin include (a) infusing bis-Schiff base resin into a carbon fiber reinforcement to form an uncured resin embedded composite, (b) positioning the uncured resin embedded composite on a substrate under a vacuum enclosure, (c) curing the bis-Schiff base resin at a first elevated temperature under vacuum to form a polymer matrix composite, (d) heating the polymer matrix composite at a second elevated temperature under inert atmosphere to form a porous carbon-carbon composite, (e) re-infusing bis-Schiff base resin into the porous carbon-carbon composite and curing under vacuum at a third elevated temperature to generate a reinfused porous carbon-carbon composite, and (f) heating the reinfused porous carbon-carbon composite at a fourth elevated temperature under inert gas to form the carbon-carbon composite. Further, the second elevated temperature and/or the fourth elevated temperature is less than 900° C.

20 Claims, 5 Drawing Sheets

METHOD OF MAKING CARBON-CARBON COMPOSITE

CROSS-REFERENCE TO RELATED APPLICATIONS

This application claims priority to U.S. Provisional Application 63/578,831, filed Aug. 25, 2023, which is incorporated by reference herein in its entirety.

STATEMENT REGARDING FEDERALLY SPONSORED RESEARCH OR DEVELOPMENT

This invention was made with U.S. Government support under Contract No. SP4701-22-P-0072 awarded by the Defense Logistics Agency to Cornerstone Research Group Inc. The U.S. Government has certain rights in the invention.

TECHNICAL FIELD

Embodiments of the present disclosure relate to methods of preparing carbon-carbon (C—C) composites and more specifically preparation of carbon-carbon composites with bis-Schiff base resin and enhanced processing time.

BACKGROUND

Carbon-carbon composites are a family of materials that consist of a carbon or graphite matrix reinforced with carbon or graphite fibers. They have high strength and are five times lighter than steel and three times lighter than aluminum. The strength to weight ratios (stiffness) provide benefits in aerospace and automotive applications.

High temperature resistant materials are also critical to enabling thermal protection systems. One specific version of these high temperature material options is carbon-carbon (C—C). However, the supply of carbon-carbon composite is limited with few qualified manufacturers, each with a limited production capacity. The limited production capacity represents a capacity which is not expected to meet projected demand needed to fulfill future needs, including for thermal protection systems.

SUMMARY

As such, there is an ongoing need for alternative processes which are more efficient in terms of time, material, and cost to make high density carbon-carbon composite. The present disclosure addresses these need by providing improved production rate and affordability for carbon-carbon composite thermal protection systems and delivery of that innovation to system manufacturers. As innovation is realized, the supply chain for carbon-carbon composites will become more resilient. Specifically, the present disclosure addresses these needs by providing a unique combination of bis-Schiff base resin, utilization of low heat treatment temperatures for carbon-carbon generation of less than 900° C., and reduced reinfusion and/or densification cycles to generate carbon-carbon composites with reduced processing time than that achievable with conventional resins and processing parameters.

Embodiments of the present disclosure relate to methods of making a carbon-carbon composite from thermosetting polymer resin. The methods include infusing bis-Schiff base resin into a carbon fiber reinforcement to form an uncured resin embedded composite and positioning the uncured resin embedded composite on a substrate under a vacuum enclosure. The bis-Schiff base resin comprises the structure of Formula (I):

Formula (I)

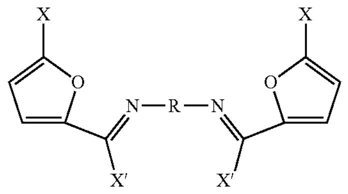

wherein: R comprises at least one aromatic moiety, X comprises an aromatic moiety, an aliphatic moiety, or a hydrogen and X' comprises an aromatic moiety, an aliphatic moiety, or a hydrogen. The methods further includes curing the carbon fiber reinforcement embedded with bis-Schiff base resin at a first elevated temperature under vacuum to form a polymer matrix composite and heating the polymer matrix composite at a second elevated temperature under inert atmosphere to form a porous carbon-carbon composite. Additionally, the methods include re-infusing bis-Schiff base resin into the porous carbon-carbon composite and curing the newly infused bis-Schiff base resin under vacuum at a third elevated temperature to generate a reinfused porous carbon-carbon composite. Finally, the methods include heating the reinfused porous carbon-carbon composite at a fourth elevated temperature under inert gas to densify the resulting reinfused porous carbon-carbon composite and form the carbon-carbon composite. In accordance with the methods, the second elevated temperature and/or the fourth elevated temperature is less than 900° C.

Embodiments of the present disclosure additionally relate to methods of making a carbon-carbon composite from thermosetting polymer resin where re-infusing bis-Schiff base resin into the porous carbon-carbon composite, curing the newly infused bis-Schiff base resin under vacuum at a third elevated temperature to generate a reinfused porous carbon-carbon composite, and heating the reinfused porous carbon-carbon composite at a fourth elevated temperature under inert gas to densify the resulting reinfused porous carbon-carbon composite and form the carbon-carbon composite is repeated at least one time to further densify the carbon-carbon composite. As such, the previously generated carbon-carbon composite is re-infused with bis-Schiff base resin in lieu of the porous carbon-carbon composite.

BRIEF DESCRIPTION OF THE DRAWINGS

The following detailed description of specific embodiments of the present disclosure can be best understood when read in conjunction with the following drawings, in which.

DETAILED DESCRIPTION

Figure 1:
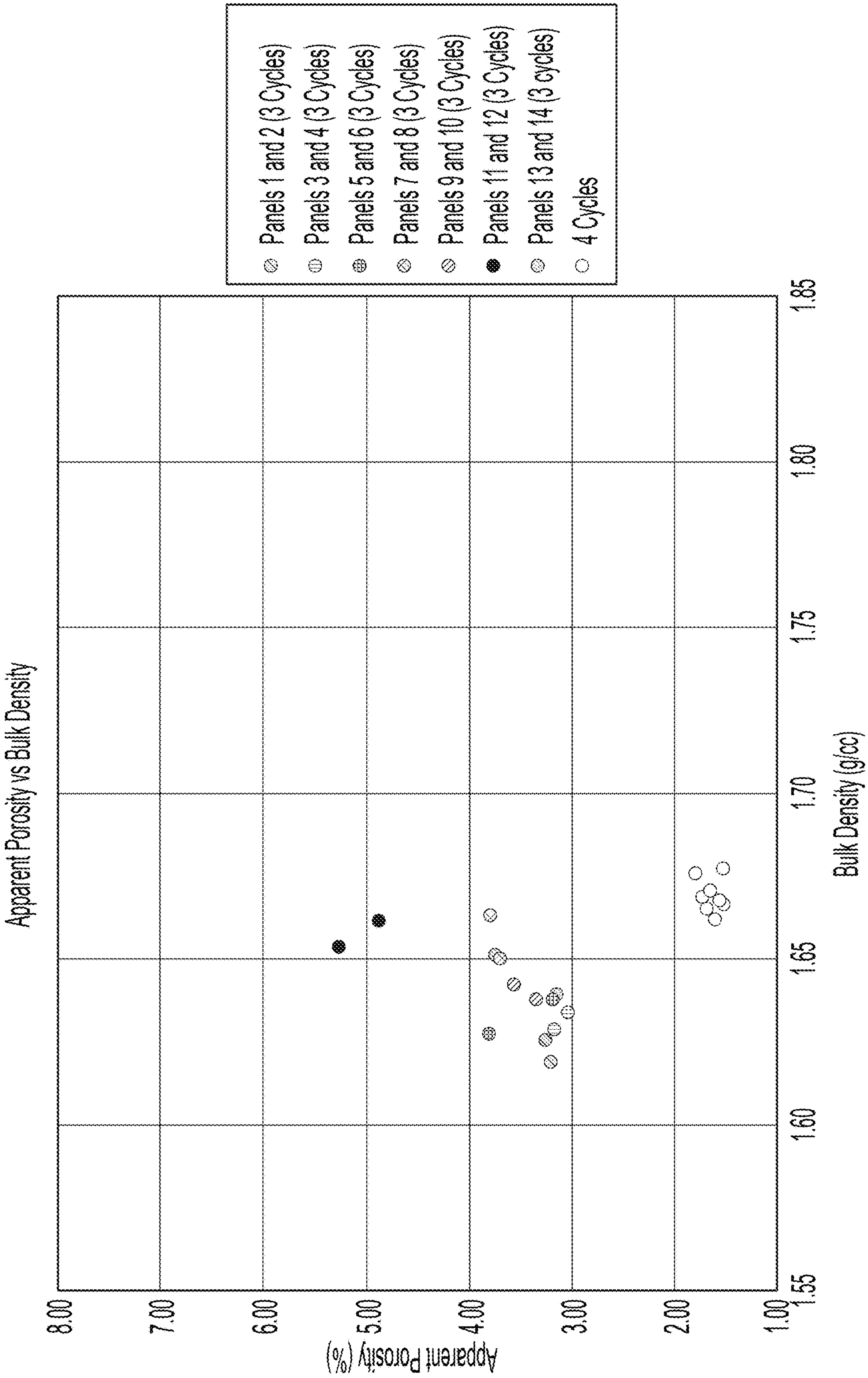
FIG. 1 is a graph of apparent density and bulk density of Carbon-Carbon composite panels according to one or more embodiments of the present disclosure.

Embodiments of the present disclosure generally relate to carbon-carbon composites and methods of making and densifying the same.

The present disclosure is relate to methods of making a carbon-carbon composite from a thermosetting resin in fewer steps and thus in less time than previous state of the art systems. Embodiments of the present disclosure comprise the use of thermosetting bis-Schiff base organic resin pre-impregnated into carbon fiber to make a thermosetting polymer matrix composite (PMC), which in turns may be subjected through a repeated sequence of heat treatments (i.e. pyrolysis and/or carbonization), including densification (i.e. re-infusion of resin into pyrolyzed and/or carbonized porous composite followed by re-pyrolysis and/or re-carbonization of the resulting composite) for conversion into a carbon-carbon composite. The unique use of specific thermosetting bis-Schiff base resin material in making carbon-carbon composite results in the ability to generate carbon-carbon composite products with fewer heating and densification steps.

The methods in accordance with the present disclosure demonstrate the use of bis-Schiff base resin systems which result in dramatic improvements in speed of production for C—C composite components. Further, the methods of the present disclosure demonstrate fabrication of C—C composites with room temperature mechanical properties comparable to state of the art C—C composites and demonstrate the ability to achieve such results in fewer heat treatment cycles compared to 6 or more heat treatment cycles as typically required.

In accordance with embodiments of the method of making a carbon-carbon composite from thermosetting polymer resin, the method comprises a series of steps. The method initially comprises (a) infusing bis-Schiff base resin into a carbon fiber reinforcement to form an uncured resin embedded composite; (b) positioning the uncured resin embedded composite on a substrate under a vacuum enclosure; and (c) curing the carbon fiber reinforcement embedded with bis-Schiff base resin at a first elevated temperature under vacuum to form a polymer matrix composite. Further, the method comprises (d) heating the polymer matrix composite at a second elevated temperature under inert atmosphere to form a porous carbon-carbon composite. Subsequently, the method comprises (e) re-infusing bis-Schiff base resin into the porous carbon-carbon composite resulting from step (d) and curing the newly infused bis-Schiff base resin under vacuum at a third elevated temperature to generate a reinfused porous carbon-carbon composite. Additionally, the method comprises (f) heating the reinfused porous carbon-carbon composite resulting from step (e) at a fourth elevated temperature under inert gas to densify the resulting reinfused porous carbon-carbon composite from step (e) and form the carbon-carbon composite. During the heating steps, the second elevated temperature and/or the fourth elevated temperature is less than 900° C. to expedite production of the carbon-carbon composite.

In one or more embodiments, steps (e) and (f) are repeated 4 times or less for a total of 5 or less cycles with the carbon-carbon composite generated in step (f) being provided as the porous carbon-carbon composite of step (e) for each successive iteration. Each sequential repetition of steps (e) and (f) results in further densification of the carbon-carbon composite. As such, steps (e) and (f) may be repeated a sufficient number of times to generate a carbon-carbon composite with desired properties including a sufficiently maximized bulk density or reduction in accessible void space and porosity below a desired threshold. In various embodiments, steps (e) and (f) are repeated up to 4 times (five densifications cycles), up to 3 times (four densifications cycles), up to 2 times (three densifications cycles), or up to 1 times (two densifications cycles).

Having generally described methods of making a carbon-carbon composite from thermosetting polymer resin, the specific steps and components will now be described in further detail.

ACC-6 (Advanced Carbon-Carbon-6) is an industry standard for carbon-carbon composites. It is made from T300 PAN-based carbon fiber, which is then impregnated with phenolic resin and densified with 6 cycles. The methods of the present disclosure achieves a bulk density and an apparent porosity that is at least as desirable as with ACC-6, but with fewer densification cycles, such as 3 or less densification cycles. Such is desirable as a reduction in steps or cycles directly results in faster production and demonstrates the ability to remove steps and/or processing time previously believed to be required.

Embodiments of the method of making a carbon-carbon composite from thermosetting polymer resin include infusing a thermosetting polymer resin into carbon fiber reinforcement. Specifically, in one or more embodiments a bis-Schiff base resin is infused into the carbon fiber reinforcement to form an uncured resin embedded composite. Utilization of the bis-Schiff base resin allows for enhanced infusion of resin into the carbon fiber reinforcement. Specific characteristics and details of the bis-Schiff base resin are provided in greater detail infra in the present disclosure.

The carbon fiber reinforcement may be chosen based on the desired application of use. In various embodiments, the carbon fiber reinforcement may be carbon fiber, random carbon mats, carbon fiber scrims, chopped carbon fibers, carbon fiber knits, unidirectional carbon fiber plies, three-dimensional carbon fiber weaves, three-dimensional carbon fiber preforms, plain weave fabric, twill fabrics, felts, stitched fabrics, tufted fabrics, or combinations thereof.

The carbon fiber reinforcement may be a unidirectional fibrous or a woven fabric material, and in some embodiments, may be arranged in a 0° and 90° or 0°, 45°, and 90° orientation between layers to provide structural support or may be in any other layup or laminate arrangement known in the industry. The carbon fiber reinforcement may be in a braided, woven, plain weave, twill weave, satin weave, in a symmetric or non-symmetric laminate stack, in any other known configuration, or in any combination of configurations. Depending on the industrial application and the part thickness desired, it may be desirable to use multiple layers of the carbon fiber reinforcement to form a layup.

In one or more embodiments, the carbon fiber reinforcement is heat treated prior to infusion of the bis-Schiff base resin. Heat treating the carbon fiber reinforcement comprising heating the carbon fiber reinforcement in an inert atmosphere to at least 2000° C., to at least 2100° C., or to approximately 2200° C. (approximately 4000° F.). The heat treatment of the carbon fiber reinforcement removes the sizing that is present on the carbon fiber and burns off or carbonizes any non-carbon present within the carbon fiber reinforcement. It will be appreciated that higher or lower heat treatment temperatures may be desired based on the particular constituents desired to be removed from the carbon fiber reinforcement. As such, temperatures less than 2000° C. or greater than 2200° C. are envisioned as possible for the heat treatment in accordance with the present disclosure.

In one or more embodiments the uncured resin embedded composite is provided as a prepreg with the bis-Schiff base resin pre-impregnated into the carbon fiber reinforcement. It will be appreciated that in one or more embodiments, indication that the uncured resin embedded composite is provided as a prepreg includes the instance where the polymer matrix formed form the bis-Schiff base resin is partially cured to allow for easier handling and transfer of the pre-preg.

Embodiments of the method of making a carbon-carbon composite from thermosetting polymer resin include positioning the uncured resin embedded composite on a substrate under a vacuum enclosure. Specifically, the uncured resin embedded composite is positioned on the substrate in a lay-up of the desired geometry and layer configuration. It will be appreciated by one skilled in the art that a lay-up process is a molding process for composite materials, in which the generated composite is obtained by overlapping a specific number of different layers of a reinforcement material along with a thermosetting polymer resin. Further, it will be appreciated that in various embodiments the laying-up or positioning of the uncured resin embedded composite on the substrate may be a dry lay-up process or a wet lay-up process. A wet lay-up processes utilizes pre-impregnated carbon fiber reinforcement in contrast to a dry lay-up process where the carbon fiber reinforcement is placed on the substrate with the bis-Schiff base resin added once the carbon fiber reinforcement is positioned. In the case of a dry lay-up process it will be appreciated that infusion of the bis-Schiff base resin into the carbon fiber reinforcement to form the uncured resin embedded composite occurs after the lay-up process and as such the carbon fiber reinforcement is positioned on the substrate in lieu of the uncured resin embedded composite.

In one or more embodiments, infusing the bis-Schiff base resin into the carbon fiber reinforcement to form the uncured resin embedded composite is conducted with a pressure differential between the carbon fiber reinforcement and a source of the bis-Schiff base resin. In one or more embodiments, a positive pressure is applied to drive the bis-Schiff base resin into the carbon fiber reinforcement. In further embodiments, a vacuum is applied at the carbon fiber reinforcement to draw the bis-Schiff base resin into the carbon fiber reinforcement. Generalized methods of infusing a thermosetting polymer resin into the carbon fiber reinforcement are generally known to those skilled in the art and as such, for conciseness, further details of the infusion process are omitted.

Embodiments of the method of making a carbon-carbon composite from thermosetting polymer resin include curing the carbon fiber reinforcement embedded with bis-Schiff base resin at a first elevated temperature under vacuum to form a polymer matrix composite. The uncured resin embedded composite formed from the carbon fiber reinforcement embedded with bis-Schiff base resin is cured under vacuum to both compress the uncured resin embedded composite and draw air out of the uncured resin embedded composite to allow the bis-Schiff base resin to maximally fill any voids in the uncured resin embedded composite. Specifically, in one or more embodiments a vacuum is applied to the vacuum enclosure to evacuate air from the uncured resin embedded composite. In one or more embodiments, the vacuum enclosure is formed by sealing or adhering a vacuum bag to the substrate such that the assembly is isolated from the surrounding atmosphere. Generation of a vacuum environment within the vacuum enclosure by evacuating air from within the vacuum enclosure ensures that the uncured resin embedded composite is substantially fully evacuated of air prior to elevating the temperature to the first elevated temperature to cure the bis-Schiff base resin.

In one or more embodiments, a breather cloth is placed over the uncured resin embedded composite when placed under the vacuum enclosure. The breather cloth generally allows passage of gases from the uncured resin embedded composite to a vacuum port where air and gases are removed from the vacuum enclosure. In the absence of a breather cloth the vacuum bag of the vacuum enclosure may be pressed against the uncured resin embedded composite thereby impeding passage of gases to the vacuum port. Breather cloths are commonly utilized with vacuum infusion and the implementation and placement of breather cloths is known to those skilled in the art and may alternatively be referenced as a bleeder cloth. In one or more embodiments, the breather cloth is formed from a polymer fabric. An example material for formation of the breather cloth is Ultraweave 606, a woven nylon mat, which is commercially available from Airtech International, Huntington Beach, California.

It will be appreciated that the strength of the vacuum generated within the vacuum enclosure is desirably as great as possible. For purposes of this disclosure, indication that a vacuum is 0 inches of mercury (inHg) indicates that no vacuum is applied and indication that a vacuum is 29.92 inHg indicates that a complete or perfect vacuum is achieved. In various embodiments, the vacuum applied to the vacuum enclosure to evacuate air from within the vacuum enclosure is 25 inHg or greater, 26 inHg or greater, 27.5 inHg or greater, or 29 inHg or greater.

It will be appreciated that compressive forces are applied to the assembly of the carbon fiber reinforcement embedded with bis-Schiff base resin by virtue of the assembly being under the vacuum enclosure with an applied vacuum. Specifically, the applied vacuum to the vacuum enclosure results in the vacuum enclosure attempting to achieve a minimal interior volume which results in the vacuum bag collapsing toward the uncured resin embedded composite and compressing the assembly there between.

In one or more embodiments an external pressure is also applied to the uncured resin embedded composite in the vacuum enclosure to minimize volume and force the bis-Schiff base resin into the accessible void space in the uncured resin embedded composite before initiation of resin curing. In one or more embodiments, the process of heating the uncured resin embedded composite to the first elevated temperature may be completed in an autoclave. As such, the autoclave may be pressurized to compress the vacuum enclosure and force residual resin into the carbon fiber reinforcement. In one or more embodiments, the external pressure that is applied to the assembly of the carbon fiber reinforcement embedded with bis-Schiff base resin forming the uncured resin embedded is applied in the range of 50 pounds per square inch (psi) to 500 psi. For example, in various embodiments, the external pressure is 50 to 300 psi, 100 to 500 psi, 100 to 300 psi, 150 to 250 psi, or approximately 200 psi.

As indicated supra, the bis-Schiff base resin in the uncured resin embedded composite is cured by heating the uncured resin embedded composites to a first elevated temperature. The specific curing temperature and time is resin specific. Example curing times and temperatures are provide in Table 1 provided infra with MG 1843, MG 0812, and MG 1134 being representative bis-Schiff base resins in accordance with the present method and phenolic resin and benzoxazine resin provided for comparison. It is noted that MG 1843, MG 0812, and MG 1134 are bis-Schiff base resins manufactured by Systima Technologies, Inc. (Kirkland, WA). Further, various phenolic resins are commercially available as the Durite line of resins from Hexion, Columbus, Ohio and the Phenalloy line of resins from Dynachem, Westerville, Illinois.

TABLE 1

Example Resin Curing Times and Temperatures

| Resin | Curing Temperature | Curing Time |
|---|---|---|
| MG 1843 | 215° C. | 120 minutes |
| MG 0812 | 250° C. | 120 minutes |
| MG 1134 | 215° C. | 120 minutes |
| Phenolic resin | 165° C. | 60 minutes |
| Benzoxazine resin | 200° C. | 120 minutes |

In one or more embodiments, the polymer matrix composite is removed from the vacuum enclosure and separated from any molds or other components utilized in the shaping, infusion, and/or curing process.

Embodiments of the method of making a carbon-carbon composite from thermosetting polymer resin include heating the polymer matrix composite at a second elevated temperature to form a porous carbon-carbon composite. Heating the polymer matrix composite at the second elevated temperature carbonizes the bis-Schiff resin in the polymer matrix composite. In one or more embodiments, heating the polymer matrix composite at the second elevated temperature to pyrolyze the bis-Schiff resin in the polymer matrix composite is completed in an inert gas environment, alternatively referenced as an inert atmosphere. An inert gas environment is an atmosphere formed from substantially only one or more inert gases. In various embodiments the inert gas provided in the inert gas environment may be nitrogen or argon. In one or more embodiments, the inert gas environment comprises a nitrogen atmosphere of at least 99% purity by volume. In one or more embodiments, the inert gas environment comprises an argon atmosphere of at least 99% purity by volume. Specifically, the air atmosphere in the oven or autoclave where pyrolysis is completed may be evacuated and replaced with the inert gas environment, such as a nitrogen gas atmosphere, for heating to pyrolyze the cured bis-Schiff base resin in the polymer matrix composite. The inert gas environment results in pyrolysis of the cured bis-Schiff base resin, but protects the resulting pyrolyzed material from oxidation and further decomposition to carbon dioxide.

In one or more embodiments, the polymer matrix composite is pyrolyzed by heating to a second elevated temperature of up to 900° C. In various further embodiments, the pyrolysis is achieved by heating the polymer matrix composite to a second elevated temperature of between 400° C. and 900° C., 400° C. and 800° C., 400° C. and 700° C., 500° C. and 900° C., 600° C. and 900° C., 700° C. and 900° C., or 600° C. and 800° C. For example, the polymer matrix composite may be heated to a second elevated temperature of 800° C. under a constant flow of argon gas to form the porous carbon-carbon composite.

In one or more embodiments, the polymer matrix composite is held at the second elevated temperature to pyrolyze the cured bis-Schiff base resin for at least 1 hour. In various further embodiments, the hold time at the second elevated temperature is at least 90 minutes, at least 2 hours, at least 3 hours, or at least 4 hours. In yet further embodiments, the polymer matrix composite is not held at the second elevated temperature, but instead the second elevated temperature is reached and cooling begins substantially immediately.

In one or more embodiments, the porous carbon-carbon composite represents the polymer matrix composite which has been heated to pyrolyze the bis-Schiff base resin and generate a material comprised substantially of carbon. The pyrolysis of the polymer matrix composite results in a material having voids where the bis-Schiff base resin was pyrolyzed and/or carbonized to occupy less volume. These voids represent the void space within the porous carbon-carbon composite. It will be appreciated that a portion of the void space is located deep within the porous carbon-carbon composite and is thus sealed away from the surrounding atmosphere. However, at least a portion of the void space is in fluid communication with the surrounding atmosphere and is termed the accessible void space. The accessible void space in the porous carbon-carbon composite is a function of the starting polymer matrix composite, the char yield of the resin used to form the uncured resin embedded composite, and the carbonization temperature utilized in formation of the same.

Embodiments of the method of making a carbon-carbon composite from thermosetting polymer resin include re-infusing bis-Schiff base resin into the porous carbon-carbon composite and curing the newly infused bis-Schiff base resin at a third elevated temperature to generate a reinfused porous carbon-carbon composite. Re-infusion of the bis-Schiff base resin into the porous carbon-carbon composite allows the accessible void space on the porous carbon-carbon composite to be filled with the bis-Schiff base resin, thereby increasing the overall density.

As with the initial infusion of bis-Schiff base resin into the carbon fiber reinforcement to form the uncured resin embedded composite, the porous carbon-carbon composite may be infused with bis-Schiff base resin in accordance with any infusion technique known to those skilled in the art. For clarity, it is noted that any techniques and particulars of the infusion provided with regards to the initial infusion of the carbon fiber reinforcement are explicitly indicated as transferable to the infusion of the porous carbon-carbon composite with the bis-Schiff base resin.

In one or more embodiments, infusing the bis-Schiff base resin into the porous carbon-carbon composite is conducted with a pressure differential between the porous carbon-carbon composite and the source of the bis-Schiff base resin. In one or more embodiments, a positive pressure is applied to drive the bis-Schiff base resin into the porous carbon-carbon composite. In further embodiments, a vacuum is applied at the porous carbon-carbon composite to draw the bis-Schiff base resin into the porous carbon-carbon composite.

In one or more embodiments, curing the newly infused bis-Schiff base resin within the reinfused porous carbon-carbon composite at the third elevated temperature is completed under vacuum. As noted with regards to the curing of the carbon fiber reinforcement embedded with bis-Schiff base resin at the first elevated temperature, curing the porous carbon-carbon composite reinfused with bis-Schiff base resin draws air out of the porous carbon-carbon composite and allows the bis-Schiff base resin to maximally fill any voids in the porous carbon-carbon. Specifically, the porous carbon-carbon composite is retained in the vacuum enclosure where a vacuum is applied to evacuate air from the porous carbon-carbon composite. Generation of a vacuum environment within the vacuum enclosure by evacuating air from within the vacuum enclosure such that the uncured resin embedded composite is substantially fully evacuated of air prior to elevating the temperature to the third elevated temperature to cure the bis-Schiff base resin within the porous carbon-carbon composite.

The porous carbon-carbon composite reinfused with the bis-Schiff base resin is cured at the third elevated temperature. In one or more embodiments, where the same bis-Schiff base resin is used throughout the method, the first elevated temperature and the third elevated temperature may be substantially the same. Similarly, it will be appreciated that if different bis-Schiff base resins are used for each reinfusion of bis-Schiff base resin, the first elevated temperature and the third elevated temperature may be distinct to align with the specific curing parameters of the particular bis-Schiff base resin utilized for each infusion.

In one or more embodiments, a breather cloth is placed over the porous carbon-carbon composite when placed under the vacuum enclosure. As previously noted, the breather cloth generally allows passage of gases from the porous carbon-carbon composite to a vacuum port where air and gases are removed from the vacuum enclosure. In the absence of a breather cloth the vacuum bag of the vacuum enclosure may be pressed against the porous carbon-carbon composite thereby impeding passage of gases to the vacuum port.

It will be appreciated that the strength of the vacuum generated within the vacuum enclosure is desirably as great as possible. In various embodiments, the vacuum applied to the vacuum enclosure to evacuate air from within the vacuum enclosure and the porous carbon-carbon composite is 25 inHg or greater, 26 inHg or greater, 27.5 inHg or greater, or 29 inHg or greater.

Embodiments of the method of making a carbon-carbon composite from thermosetting polymer resin include heating the reinfused porous carbon-carbon composite at a fourth elevated temperature to densify the reinfused porous carbon-carbon composite and form the carbon-carbon composite. Heating the reinfused porous carbon-carbon composite at the fourth elevated temperature carbonizes the bis-Schiff resin in the reinfused porous carbon-carbon composite. In one or more embodiments, heating the reinfused porous carbon-carbon composite at the fourth elevated temperature to pyrolyze the bis-Schiff resin in the reinfused porous carbon-carbon composite is completed in an inert gas environment, alternatively referenced as an inert atmosphere. In various embodiments the inert gas provided in the inert gas environment may be nitrogen or argon. In one or more embodiments, the inert gas environment comprises a nitrogen atmosphere of at least 99% purity by volume. In one or more embodiments, the inert gas environment comprises an argon atmosphere of at least 99% purity by volume. Specifically, the air atmosphere in the oven or autoclave where pyrolysis is completed may be evacuated and replaced with the inert gas environment, such as a nitrogen gas atmosphere, for heating to pyrolyze the cured bis-Schiff base resin in the reinfused porous carbon-carbon composite. As previously indicated, the inert gas environment results in carbonization of the cured bis-Schiff base resin, but protects the resulting pyrolyzed material from oxidation and further decomposition to carbon dioxide.

In one or more embodiments, carbonization is achieved by heating the reinfused porous carbon-carbon composite to a fourth elevated temperature of up to 900° C. In various further embodiments, the pyrolysis is achieved by heating the polymer matrix composite to a fourth elevated temperature of between 400° C. and 900° C., 400° C. and 800° C., 400° C. and 700° C., 500° C. and 900° C., 600° C. and 900° C., 700° C. and 900° C., or 600° C. and 800° C. For example, the polymer matrix composite may be heated to a fourth elevated temperature of 800° C. under a constant flow of argon gas to form the porous carbon-carbon composite.

In one or more embodiments, the reinfused porous carbon-carbon composite is held at the fourth elevated temperature to pyrolyze the cured bis-Schiff base resin for at least 1 hour. In various further embodiments, the hold time at the fourth elevated temperature is at least 90 minutes, at least 2 hours, at least 3 hours, or at least 4 hours. In yet further embodiments, the polymer matrix composite is not held at the fourth elevated temperature, but instead the fourth elevated temperature is reached and cooling begins substantially immediately.

Embodiments of the method of making a carbon-carbon composite from thermosetting polymer resin include heating the carbon-carbon composite generated from heating to the fourth elevated temperature at a fifth elevated temperature to further carbonize the carbon-carbon composite. Heating the reinfused porous carbon-carbon composite at the fifth elevated temperature further carbonizes the bis-Schiff resin in the carbon-carbon composite. In one or more embodiments, heating the carbon-carbon composite generated from heating to the fourth elevated temperature at the fifth elevated temperature to further carbonize the bis-Schiff resin in the carbon-carbon composite is completed in an inert gas environment, alternatively referenced as an inert atmosphere. In various embodiments the inert gas provided in the inert gas environment may be nitrogen or argon. In one or more embodiments, the inert gas environment comprises a nitrogen atmosphere of at least 99% purity by volume. In one or more embodiments, the inert gas environment comprises an argon atmosphere of at least 99% purity by volume. Specifically, the air atmosphere in the oven or autoclave where pyrolysis is completed may be evacuated and replaced with the inert gas environment, such as a nitrogen gas atmosphere, for heating to carbonize the cured bis-Schiff base resin in the carbon-carbon composite. As previously indicated, the inert gas environment results in carbonization of the cured bis-Schiff base resin, but protects the resulting pyrolized material from oxidation and further decomposition to carbon dioxide.

In one or more embodiments, carbonization, and in some cases, graphitization, is achieved by heating the carbon-carbon composite generated from heating to the fourth elevated temperature to a fifth elevated temperature of at least 900° C. In various further embodiments, the carbonization is achieved by heating the carbon-carbon composite generated from heating to the fourth elevated temperature to a fifth elevated temperature of between 900° C. and 1800° C., 1100° C. and 1700° C., 1200° C. and 1600° C., 1200° C. and 2800° C., 1200° C. and 2600° C., or 1200° C. and 2200° C. For example, the carbon-carbon composite generated from heating to the fourth elevated temperature may be heated to a fifth elevated temperature of 1600° C. under a constant flow of argon gas to form the carbon-carbon composite.

In one or more embodiments, carbon-carbon composite generated from heating to the fourth elevated temperature is held at the fifth elevated temperature to further carbonize the cured bis-Schiff base resin for at least 1 hour. In various further embodiments, the hold time at the fifth elevated temperature is at least 90 minutes, at least 2 hours, at least 3 hours, or at least 4 hours. In yet further embodiments, the carbon-carbon composite generated from heating to the fourth elevated temperature is not held at the fifth elevated temperature, but instead the fifth elevated temperature is reached and cooling begins substantially immediately.

In accordance with one or more embodiments, the re-infusing of bis-Schiff base resin into the porous carbon-carbon composite, curing, and subsequent heating to the fourth elevated temperature to pyrolyze the bis-Schiff base resin may be repeated.

The densification of the carbon-carbon composite from the repeated re-infusing of bis-Schiff base resin into the porous carbon-carbon composite, curing, and subsequent heating to the fourth elevated temperature, and fifth elevated temperature in some embodiments, to carbonize the bis-Schiff base resin generates a serial reduction in the accessible void space from the porous carbon-carbon composite to the carbon-carbon composite. In one or more embodiments the accessible void space may be up to 35% by volume of the porous carbon-carbon composite. It will be appreciated that the densification achieved with the methods in accordance with the present disclosure may reduce the accessible void space, also known as the open porosity, to less than 5% by volume, less than 3% by volume, less than 2% by volume, or less than 1% by volume in the carbon-carbon composite.

In one or more embodiments, the carbon material density of the carbon-carbon composite is greater than 1.7 g/cm$^3$. It will be appreciated that the carbon material density represents the density of the carbon forming the carbon-carbon composite by accounting for the porosity of the carbon-carbon composite. Specifically, the carbon material density provides the theoretical density of the carbon-carbon composite if the porosity of the carbon-carbon composite was reduced to zero percent. In various embodiments, the carbon material density of the carbon-carbon composite is greater than 1.75 g/cm$^3$, greater than 1.8 g/cm$^3$, greater than 1.85 g/cm$^3$, greater than 1.9 g/cm$^3$, or greater than 1.95 g/cm$^3$.

The carbon material density of the carbon-carbon composite in excess of 1.7 g/cm$^3$ is believed achievable as a result of the use of thermosetting bis-Schiff base resin and employing heat treatment temperatures and regimes in accordance with the present disclosure. Carbon material density approaching the theoretical density of graphite at 2.26 g/cm$^3$ can be attained in the resulting fully densified carbon-carbon composite. Such unexpectedly high density in the resulting carbon-carbon composite indicates that graphitization of the composite expectantly occurs during heat treatment step in accordance with the present disclosure as a result of the unique combination of fifth elevated heat treatment temperature and use of bis-Schiff base resin.

In one or more embodiments, the apparent density of the carbon-carbon composite is greater than 1.6 g/cm$^3$. It will be appreciated that the apparent density, alternatively called the bulk density, represents the overall density of the carbon-carbon composite. Specifically, the apparent density of the carbon-carbon composite provides the overall density of the carbon-carbon composite where remaining porosity in the carbon-carbon composite results in a reduction in the apparent density as compared to the carbon material density. In various embodiments, the apparent density of the carbon-carbon composite is greater than 1.61 g/cm$^3$, greater than 1.62 g/cm$^3$, greater than 1.63 g/cm$^3$, greater than 1.64 g/cm$^3$, or greater than 1.65 g/cm$^3$.

Having described method of making a carbon-carbon composite from thermosetting polymer resin, the details of bis-Schiff base resins are provided infra to assist one skilled in the art in performing the disclosed methods and to fully define the scope of bis-Schiff base resins in the context of the present disclosure.

Bis-Schiff base resins generally comprise the structure of Formula (I):

Formula (I)

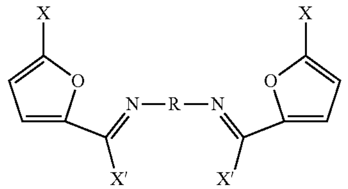

where R is an aromatic moiety, and X and X' may both or independently comprise aromatic, aliphatic moieties, or a hydrogen. The aromatic moiety may be any suitable constituent containing a cyclic, ring-shaped functional group. The aliphatic moiety may be any saturated or unsaturated, straight or branched open-chain compound. In some embodiments, X, X', or both X and X' may be a hydrogen atom.

Any suitable aromatic moiety may be chosen for R, which may vary based on the desired application of use. In some embodiments, R may contain at least one of a phenyl group, a naphthyl group, an ether group, a sulfur group, a sulfonyl group, an imine group, an amide group, a methylene group, a dialkyl methylene group, an isopropyl group, a trifluoromethyl group, a hexafluoroisopropyl group, a carbonyl group, a benzyl group, or combinations of these. In some embodiments, R may be an aromatic moiety having the structure of at least one of Formula (II) or Formula (III):

Formula (II)

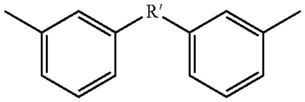

Formula (III)

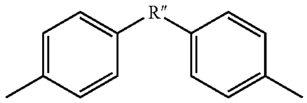

where R' and R" may be, for instance, an oxygen group, an imine group, an amide group, a methylene group, a dialkyl methylene group, an isopropyl group, a trifluoromethyl group, a hexafluoroisopropyl group, an ether group, a sulfonyl group, a sulfur group.

It should be understood that a "group" is used to refer to a moiety containing at least one atom. For instance, an "oxygen group" is used to refer to any moiety containing oxygen, such as a single oxygen atom or a complex arrangement containing one or many oxygen atoms. In any of the formulas depicted throughout this disclosure, an unconnected bond "—X" refers to an open covalent bond, which may be a single, double, or even a triple bond between that constituent and another molecule.

In some embodiments, R may contain one or more of Formula (IV), Formula (V), Formula (VI), Formula (VII), Formula (VIII), Formula (IX), Formula (X), Formula (XI), Formula (XII), Formula (XIII), Formula (XIV), Formula (XV), Formula (XVI), Formula (XVII), Formula (XVIII), Formula (XIX), Formula (XX), Formula (XXI), Formula (XXII), Formula (XXIII), Formula (XXIV), Formula (XXV), Formula (XXVI), Formula (XXVII), Formula (XXVIII), Formula (XXIX), Formula (XXX), or Formula (XXXI):

Formula (IV)
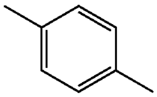
Formula (V)
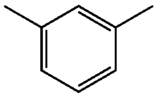
Formula (VI)
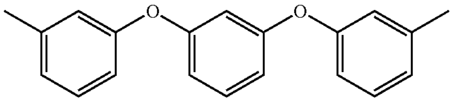
Formula (VII)
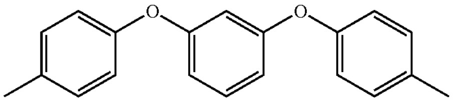
Formula (VIII)
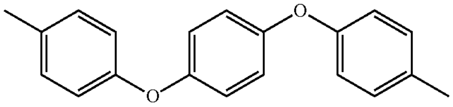
Formula (IX)
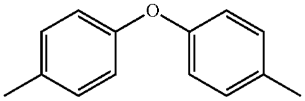
Formula (X)
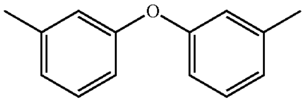
Formula (XI)
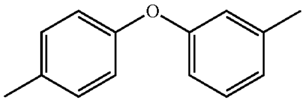
Formula (XII)
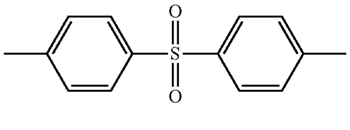
Formula (XIII)
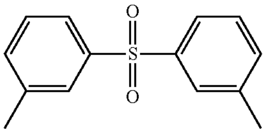
Formula (XIV)
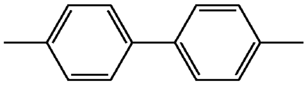
Formula (XV)
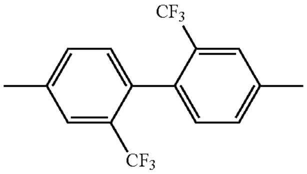
Formula (XVI)
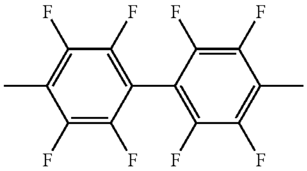
Formula (XVII)
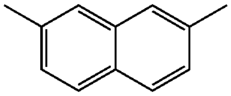
Formula (XVIII)
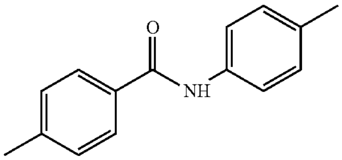
Formula (XIX)
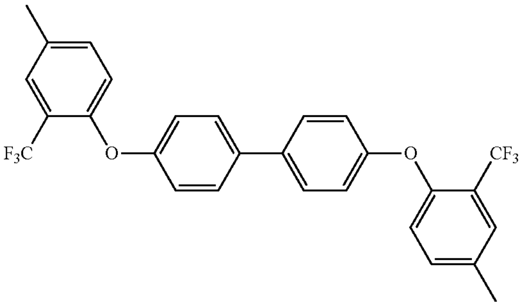
Formula (XX)
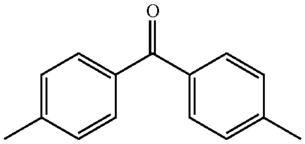
Formula (XXI)
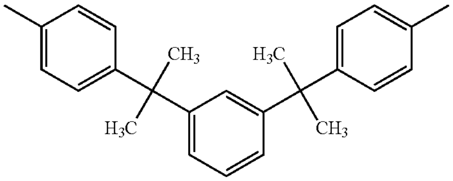

-continued
Formula (XXII)
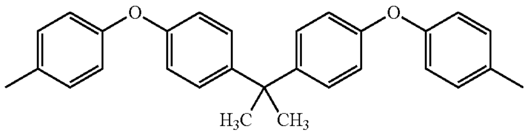
Formula (XXIII)
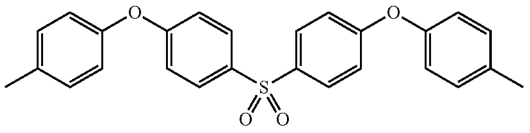
Formula (XXIV)
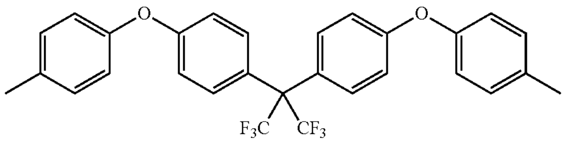
Formula (XXV)
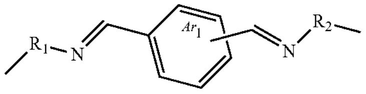
Formula (XXVI)
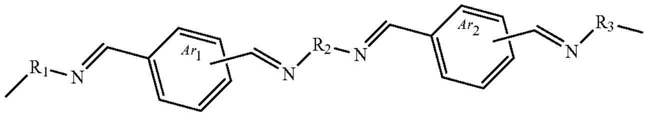
Formula (XXVII)
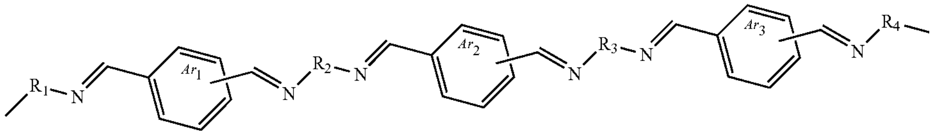
Formula (XXVIII)
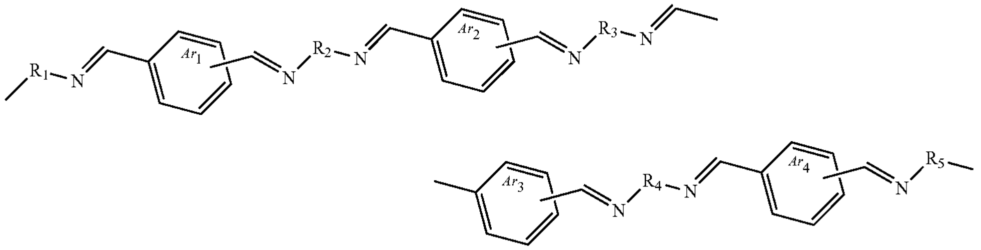
Formula (XXIX)
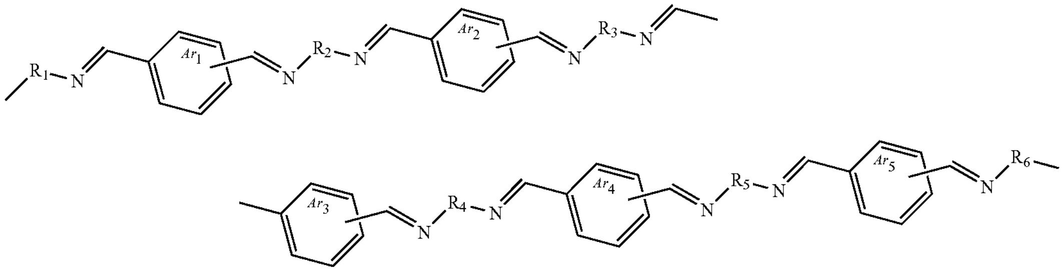
Formula (XXX)
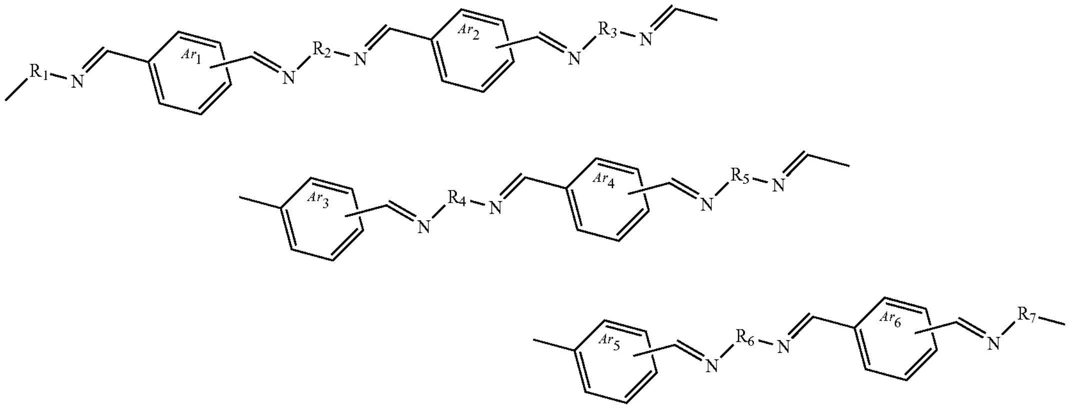

-continued

Formula (XXXI)

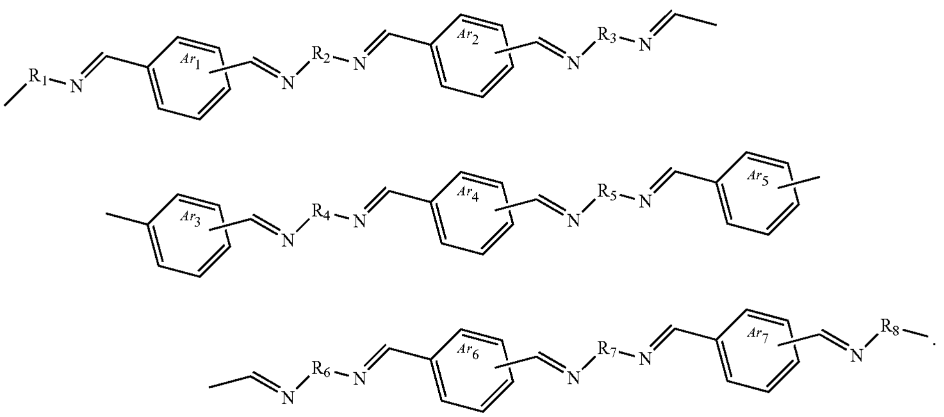

In one or more embodiments, for Formula (XXV), Formula (XXVI), Formula (XXVII), Formula (XXVIII), Formula (XXIX), Formula (XXX), or Formula (XXXI), $R_1$, $R_2$, $R_3$, $R_4$, $R_5$, $R_6$, $R_7$, and $R_8$ are each independently selected from Formula (IV), Formula (V), Formula (VI), Formula (VII), Formula (VIII), Formula (IX), Formula (X), Formula (XI), Formula (XII), Formula (XIII), Formula (XIV), Formula (XV), Formula (XVI), Formula (XVII), Formula (XVIII), Formula (XIX), Formula (XX), Formula (XXI), Formula (XXII), Formula (XXIII), and Formula (XXIV), and the aromatic moieties $Ar_1$, $Ar_2$, $Ar_3$, $Ar_4$, $Ar_5$, $Ar_6$, and $Ar_7$ may be meta-substituted or para-substituted. It is noted that Formula (XXVIII), Formula (XXIX), Formula (XXX), and Formula (XXXI) are illustrated in broken form for clarity with the broken bonds represented by a tilde across the bond.

In some embodiments, the bis-Schiff base resin may be provided as a neat polymerizable resin. In further embodiments, the bis-Schiff base resin may contain a monomer having the structure of Formula (I) with less than or equal to 5 wt % of fillers, reinforcements, pigments stabilizers, or additives, based on the total weight of the resin. In some embodiments, the bis-Schiff base resin may contain only a monomer having the structure of Formula (I) with less than or equal to 3 wt %, less than 2 wt %, or less than 1 wt % of fillers, reinforcements, pigments stabilizers, or additives, based on the total weight of the resin. In some embodiments, the bis-Schiff base resin may not contain, or may not contain more than trace amounts of fillers, reinforcements, pigments stabilizers, or additives.

Example techniques and procedures for production of the bis-Schiff base resin is provided in U.S. Pat. Nos. 10,501,578 and 11,028,194, both of which are incorporated by reference in their entirety.

The bis-Schiff base resin may have improved rheological properties including viscosity stability and melt viscosity. In some embodiments, the bis-Schiff base resin may have a viscosity of less than or equal to 100,000 centipoises (cP) (i.e., 100 Pascal-seconds (Pa·s)) at temperatures of from 60° C. to 150° C. for at least 4 hours. The bis-Schiff base resin may have a melt viscosity that is relatively stable between 60° C. and 170° C., which may indicate that the bis-Schiff base resin is not curing or crosslinking or has a very slow curing rate below 170° C. In some embodiments, the bis-Schiff base resin may have a viscosity of less than or equal to 100,000 cP at temperatures of from 100° C. to 150° C., from 100° C. to 120° C., from 120° C. to 150° C., from 60° C. to 170° C., or from 60° C. to 120° C. for at least 4 hours, for at least 3 hours, for at least 2 hours, for at least 1 hour, for at least 5 hours, or for at least 6 hours. For instance, in some embodiments, the bis-Schiff base resin may have a viscosity of between 100 cP and 750 cP for at least 4 hours at 120° C. The chemical composition may have a viscosity of between 100 cP and 750 cP, 250 cP and 600 cP, or 300 cP and 500 cP for at least 4 hours at 120° C. In some embodiments, the bis-Schiff base resin may have a melt viscosity of less than or equal to 100,000 cP at less than or equal to 150° C., as measured by rotation rheometry. In some particular embodiments, the bis-Schiff base resin may even have a melt viscosity of less than or equal to 500 cP at less than or equal to 150° C., as measured by rotation rheometry.

In some embodiments, the bis-Schiff base resin may have a low viscosity, such as below about 100,000 cP at temperatures below 170° C. The viscosity may be measured by rotational rheometry by acquiring viscosity versus temperature curves on a parallel plate rheometer, commercially available from TA Instruments (New Castle, DE) at a controlled strain of 0.01% and an angular frequency of 10.00 radians per second (rad/s) by heating samples at a rate of 2° C. per minute to the isothermal temperature specified. In one or more embodiments, the bis-Schiff base resin may have a melt viscosity of less than or equal to 500 cP at 125° C. as measured by rotation rheometry. In one or more embodiments, the bis-Schiff base resin may have a melt viscosity of less than or equal to 100,000 cP at 125° C. as measured by rotation rheometry. For instance, the bis-Schiff base resin may have a melt viscosity of from 10,000 to 100,000 cP, from 40,000 to 80,000 cP, or from 20,000 to 50,000 cP at 125° C. In some particular embodiments, the bis-Schiff base resin may have an extremely low viscosity at less than 200° C., such as less than 500 cP. In some particular embodiments, the bis-Schiff base resin may have a melt viscosity of from 100 to 500 cP, from 200 to 400 cP, or from 300 to 500 cP at 125° C.

As a non-limiting example, a bis-Schiff base resin in which R is in accordance with Formula (VII) may be thermally polymerized in a mold at 220° C. for 4 hours to produce a thermosetting polymer that has a glass transition temperature of 154° C. with a storage modulus of 3.1 gigapascals (GPa) at room temperature.

In one or more embodiments, the char yield of the bis-Schiff resin in the carbon-carbon composite is greater than 50%. In various embodiments, the char yield of the bis-Schiff resin in the carbon-carbon composite is greater than 58%, greater than 62%, greater than 68%, greater than 70%, greater than 75%, greater than 78%, or 60 to 85%. It will be appreciated that char yield is defined as the difference in mass between the bis-Schiff base resin heated in the inert gas divided by the original sample weight.

Having described the method of making a carbon-carbon composite from thermosetting polymer resin, and more specifically with bis-Schiff base resin, the benefits of such process over current technologies becomes apparent. For example, the use of thermosetting bis-Schiff base resins to make polymer matrix composites is beneficial as they exhibit advantageous rheological properties at infusion temperature that can enable faster resin infusion into carbon fiber reinforcement and also the subsequent pyrolyzed, carbonized, and/or graphitized porous carbon-carbon composite intermediates. Specifically, bis-Schiff base resins experience a dramatic drop in viscosity at low temperatures that allow it to penetrate a porous composite with ease at relatively low pressure, generally less than or equal to 200 psi. The low viscosity of the bis-Schiff base resin allows liquid resin infusion techniques such as vacuum infusion or employment of a resin transfer molding pump to be used during the densification step with shorter processing time. It will be appreciated that in general, to achieve higher density of the final carbon-carbon composite, the number of densification cycle will need to be increased. As the number of densification cycles increases, the porosity of the carbon-carbon composite intermediate generally decreases. Conventional methods and resins present limitations during the densification step, either due to the lower char yield of the resin or high viscosity of the resin that requires solvent dilution for effective infusion. In either case, the efficiency of densification in making final carbon-carbon composite is low and the time required to complete a densification step can take days or weeks. In contrast, besides having low viscosity at infusion temperature, the cured bis-Schiff base resin in accordance with the present disclosure also has a high char yield that can reach as high as 85% or greater, resulting in more efficient conversion to carbon-carbon composite at each densification cycle of infusion and pyrolysis and significant reduction of processing time through the reduction in cycles required to achieve high density. The result is a significant reduction in time and labor cost for making carbon-carbon composite product.

In order that the previously described embodiments may be more easily understood, reference is made to the following example that illustrates one or more features of the present disclosure. The example is in no way intended to be limiting in scope.

EXAMPLES

Carbon-carbon composites were generated with distinct heating parameters to demonstrate the improved densification and generation of carbon-carbon composite in accordance with the present disclosure. Each sample for testing was prepared as an uncured resin embedded composite in accordance with the present disclosure with bis-Schiff base resin (MG 1843, Systima Technologies, Inc.) and polyacrylonitrile (PAN) based carbon fiber (T300, Toray Composite Materials America Inc.). Specifically, MG1843-T300-HT-8HS-42 prepreg and MG 1843 densification resin were utilized. To evaluate multiple pyrolysis cycles and to define the effects of process time and temperature on C—C composite performance 14 polymer matrix composite (PMC) panels (5.5"×11"×12 plies) were generated accordingly to variations of the present disclosure. Seven differing heat treatment protocols were evaluated in this effort.

Table 1 provided below shows the heat treatment cycles evaluated. The last two columns in Table 1 show the total cumulative furnace time across the production of the panels. This effort was performed in lab scale furnaces, due to the design of these furnaces, pyrolysis and carbonization steps were needed to be performed in specialized furnaces. This resulted in additional time required for cooling the part between cycles and re-heating to the previously reached temperature. This cycling would not be required with a production furnace. Accordingly, with industrial scale production, pyrolysis and carbonization will be able to be combined with the combined cycles resulting in the reduced times shown under the Total Time (Production Furnace) column. Columns are also provided with headers of "pyro" representing pyrolysis, "Dens" representing re-infusion of resin (densification), and "Carb" representing carbonization. If a heating was not completed, it is delineated with a series of dashes ("---").

TABLE 1

| | Carbon-Carbon Process | | | | | | | | | | | Total | Total |
|---|---|---|---|---|---|---|---|---|---|---|---|---|---|
| Panel ID | Pyro (° C.) | Carb (° C.) | Dens | Pyro (° C.) | Carb (° C.) | Dens | Pyro (° C.) | Carb (° C.) | Dens | Pyro (° C.) | Carb (° C.) | Time[1] (hours) | Time[2] (hours) |
| 1&2 | 800 | 1200 | CS0<br>↓<br>CS1 | 800 | 1200 | CS1<br>↓<br>CS2 | 800 | 1600 | CS2<br>↓<br>CS3 | 800 | 1200 | 353 | 139 |
| 3&4 | 800 | 1200 | CS0<br>↓<br>CS1 | 800 | 1200 | CS1<br>↓<br>CS2 | 800 | 1200 | CS2<br>↓<br>CS3 | 800 | 1600 | 353 | 139 |
| 5&6 | 800 | — | CS0<br>↓<br>CS1 | 800 | — | CS1<br>↓<br>CS2 | 800 | 1600 | CS2<br>↓<br>CS3 | 800 | — | 167 | 109 |
| 7&8 | 800 | — | CS0<br>↓<br>CS1 | 800 | 1600 | CS1<br>↓<br>CS2 | 800 | — | CS2<br>↓<br>CS3 | 800 | — | 167 | 109 |
| 9&10 | 800 | — | CS0<br>↓<br>CS1 | 800 | 1600 | CS1<br>↓<br>CS2 | 800 | 1600 | CS2<br>↓<br>CS3 | 800 | 1600 | 317 | 143 |

TABLE 1-continued

| | Carbon-Carbon Process | | | | | | | | | | | Total | Total |
|---|---|---|---|---|---|---|---|---|---|---|---|---|---|
| Panel ID | Pyro (° C.) | Carb (° C.) | Dens | Pyro (° C.) | Carb (° C.) | Dens | Pyro (° C.) | Carb (° C.) | Dens | Pyro (° C.) | Carb (° C.) | Time[1] (hours) | Time[2] (hours) |
| 11&12 | 800 | — | CS0 ↓ CS1 | 800 | — | CS1 ↓ CS2 | 800 | — | CS2 CS3 ↓ | 800 | — | 92 | 92 |
| 13&14 | 900 | 1200 | CS0 ↓ CS1 | 900 | 1200 | CS1 ↓ CS2 | 900 | 1200 | CS2 ↓ CS3 | 900 | 1650 | 370 | 145 |

[1]Lab Furnace

[2]Production Furnace

Given identical reinforcement and a similar carbon matrix, the combination of the density and porosity of a C—C panel is frequently used to judge the "goodness" of a process. A reasonable target for these values, if one is expecting to have good mechanical properties, would be to produce panels with similar density amorphous carbon and low porosity. With reference to FIG. 1, a plot of the apparent porosity of the 3 densification cycle processes provided in Table 1 as well as a comparative 4 densification cycle process is shown. It is noted that the 4 cycle panels use the same processing as Panels 13 and 14, but with a $4^{th}$ cycle. It is noted that all the samples demonstrate a bulk density of greater than 1.6 g/cc. For comparison, it is noted that current state of the art polymer derived carbon-carbon composites typically have a bulk density on the order of 1.6.

It will further be appreciated that as ACC-6 is currently the standard, the carbon-carbon composites made according to the present disclosure only desirably need to meet, not significantly exceed, the properties of the ACC-6 to demonstrate utility given there improved processing time. ACC-6 meets the desired performance standards for mechanical properties so it would be unnecessary to significantly exceed such parameters. Instead the present disclosure demonstrates an advancement over the current art in that it achieves the same or better properties with fewer processing steps and/or less processing time.

To demonstrate the achieved mechanical performance, Panels 3 & 4, 5 & 6, 9 & 10, and 13 & 14 were subjected to mechanical testing. Mechanical results were obtained and statistical analysis was performed based on the following test methods:

a) Interlaminar Tensile (ILT), AKA Flatwise Tensile (FWT)—ASTM D7291/D7291M-15;
b) Interlaminar Shear (ILS), AKA Double Notch Shear (DNS)—ASTM C1292-16;
c) In-Plane Compression—ASTM D695-15 (Modified); and
d) In-Plane Tensile—ASTM D638-14 (Modified).

Figure 2:
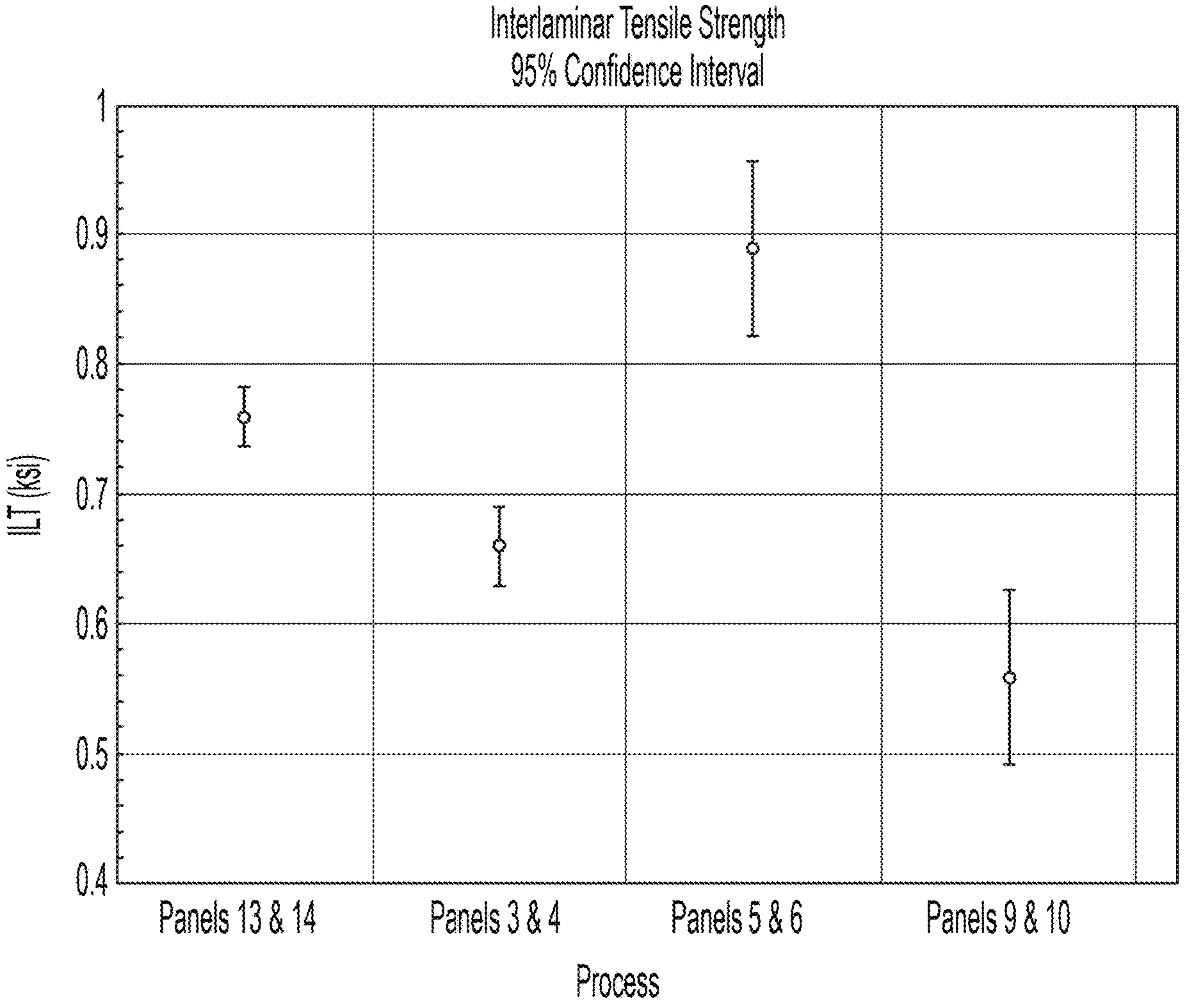
FIG. 2 is a graph of interlaminar tensile strength of Carbon-Carbon composite panels according to one or more embodiments of the present disclosure.

The results of the Interlaminar Tensile Strength testing are presented in FIG. 2 in which the error bars represent the 95% confidence interval.

Figure 3:
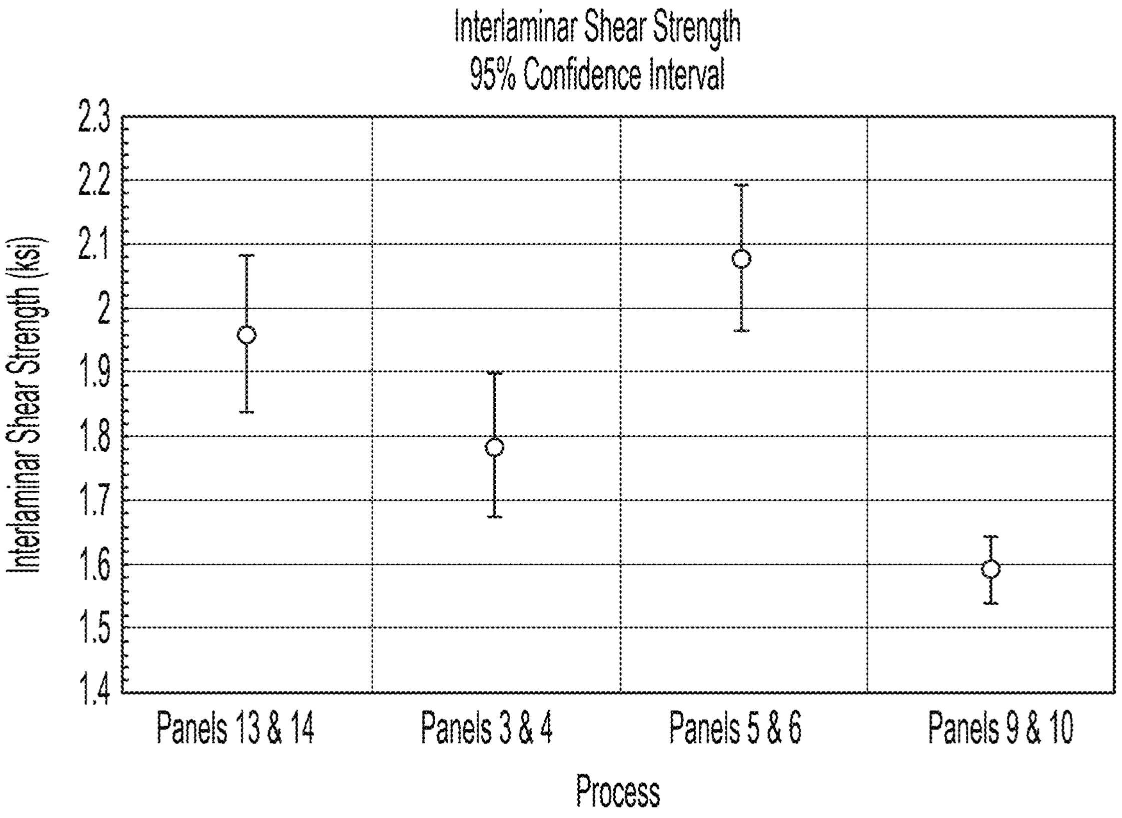
FIG. 3 is a graph of interlaminar shear strength of Carbon-Carbon composite panels according to one or more embodiments of the present disclosure.

The results of the Interlaminar Shear Strength testing are presented in FIG. 3 in which the error bars represent the 95% confidence interval.

Figure 4:
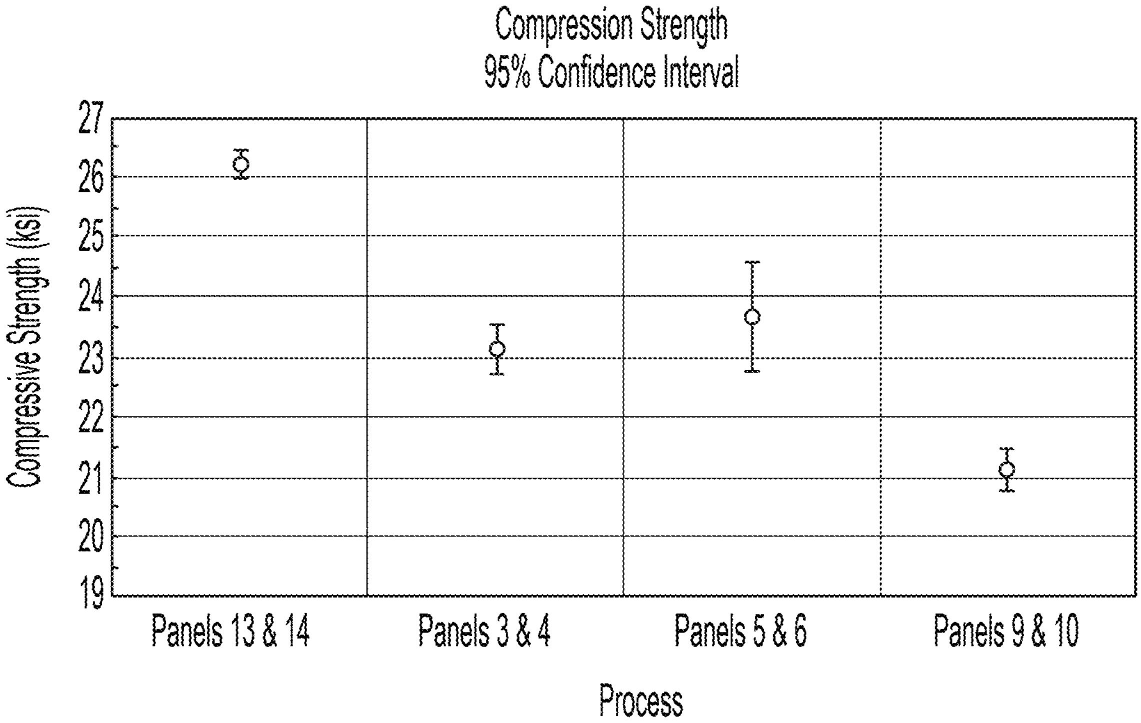
FIG. 4 is a graph of in-plane compression strength of Carbon-Carbon composite panels according to one or more embodiments of the present disclosure.

The results of the In-Plane Compression testing are presented in FIG. 4 in which the error bars represent the 95% confidence interval.

Figure 5:
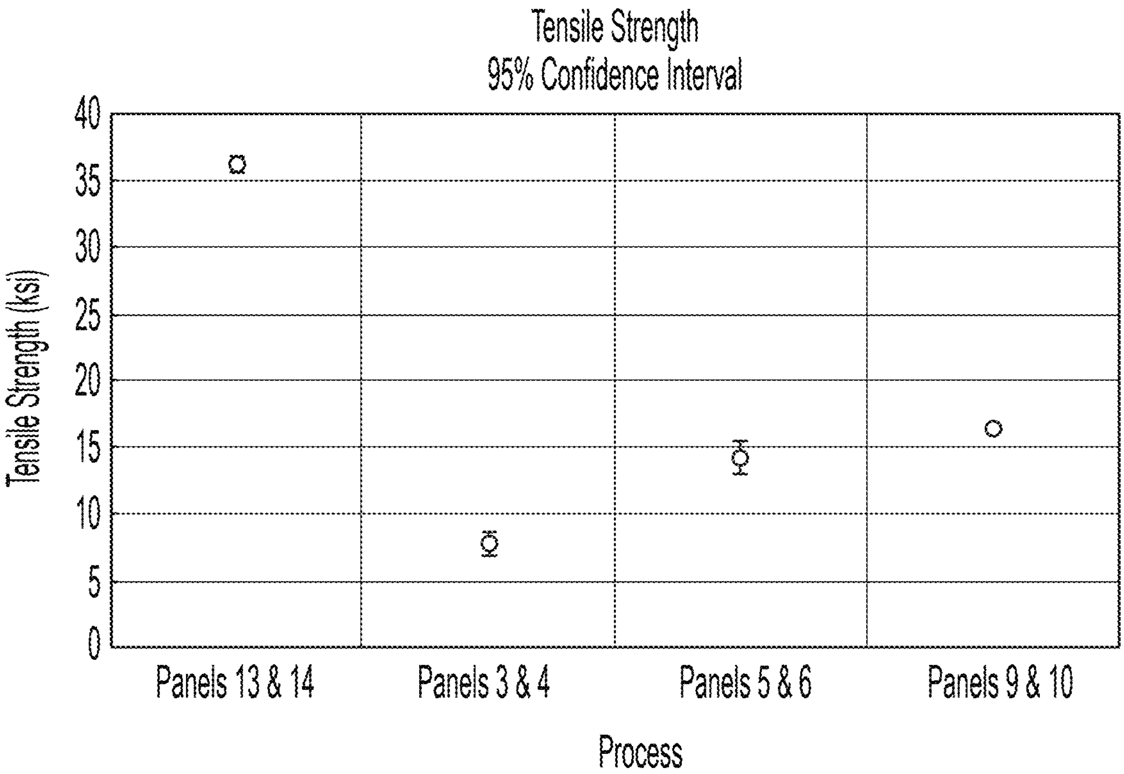
FIG. 5 is a graph of in-plane tensile strength of Carbon-Carbon composite panels according to one or more embodiments of the present disclosure.

The results of the In-Plane Tensile Strength testing are presented in FIG. 5 in which the error bars represent the 95% confidence interval.

Having described various embodiments, it should be understood that the various aspects of the method of making a carbon-carbon composite from thermosetting polymer resin may be utilized in conjunction with various other aspects.

In a first aspect, the disclosure provides a method of making a carbon-carbon composite from thermosetting polymer resin. The method comprises the steps of a) infusing bis-Schiff base resin into carbon fiber reinforcement to form an uncured resin embedded composite, the bis-Schiff base resin comprising the structure of Formula (I):

Formula (I)

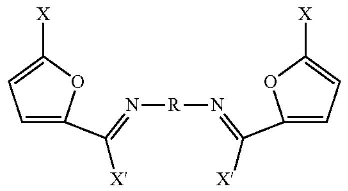

wherein: R comprises at least one aromatic moiety, X comprises an aromatic moiety, an aliphatic moiety, or a hydrogen and X' comprises an aromatic moiety, an aliphatic moiety, or a hydrogen; b) positioning the resin embedded composite on a substrate under a vacuum enclosure; c) curing the carbon fiber reinforcement embedded with bis-Schiff base resin at a first elevated temperature under vacuum to form a polymer matrix composite; d) heating the polymer matrix composite at a second elevated temperature under inert atmosphere to form a porous carbon-carbon composite; e) re-infusing bis-Schiff base resin into the porous carbon-carbon composite resulting from step (d) and curing the newly infused bis-Schiff base resin at a third elevated temperature to generate a reinfused porous carbon-carbon composite; and f) heating the reinfused porous composite resulting from step (e) at a fourth elevated temperature under inert gas to densify the resulting reinfused carbon-carbon composite from step (e) and form the carbon-carbon composite; wherein the second elevated temperature and/or the fourth elevated temperature is less than 900° C.

In a second aspect, the disclosure provides the method of the first aspect, in the carbon fiber reinforcement is unidirectional fibers, woven fabric, braided fabric, or 3D fiber preform.

In a third aspect, the disclosure provides the method of the first or second aspect, in which the uncured resin embedded composite is a prepreg.

In a fourth aspect, the disclosure provides the method of any of the first through third aspects, in which the infusion step of step (a) is conducted with a pressure differential between the carbon fiber reinforcement and a source of the bis-Schiff base resin.

In a fifth aspect, the disclosure provides the method of any of the first through fourth aspects, in which the infusion step of step (e) is conducted with a pressure differential between the porous carbon-carbon composite and a source of the bis-Schiff base resin.

In a sixth aspect, the disclosure provides the method of any of the first through fifth aspects, in which the steps (e) and (f) are repeated 4 times or less for a total of 5 or less cycles.

In a seventh aspect, the disclosure provides the method of any of the first through fifth aspects, in which the steps (e) and (f) are repeated 3 times or less for a total of 4 or less cycles.

In an eighth aspect, the disclosure provides the method of any of the first through fifth aspects, in which the steps (e) and (f) are repeated 2 times or less for a total of 3 or less cycles.

In a ninth aspect, the disclosure provides the method of any of the first through eight aspects, in which the carbon-carbon composite from step (f) is heated to a fifth temperature of 900° C. to 1800° C.

In a tenth aspect, the disclosure provides the method of any of the first through eighth aspects, in which the carbon-carbon composite from step (f) is heated to a fifth temperature of 1100° C. to 1700° C.

In an eleventh aspect, the disclosure provides the method of any of the first through eighth aspects, in which the carbon-carbon composite from step (f) is heated to a fifth temperature of 1200° C. to 1600° C.

In a twelfth aspect, the disclosure provides the method of any of the first through eleventh aspects, in which the bulk density of the carbon-carbon composite is greater than 1.6 g/cm$^3$.

In a thirteenth aspect, the disclosure provides the method of any of the first through twelfth aspects, in which the vacuum enclosure comprises a vacuum bag.

In a fourteenth aspect, the disclosure provides the method of any of the first through thirteenth aspects, in which the vacuum applied in step (c) is 25 inches of Hg or greater.

In a fifteenth aspect, the disclosure provides the method of any of the first through fourteenth aspects, in which the vacuum applied in step (e) is 25 inches of Hg or greater.

In a sixteenth aspect, the disclosure provides the method of any of the first through fifteenth aspects, in which the bis-Schiff base resin has a viscosity below 100,000 cP at 170° C.

In a seventeenth aspect, the disclosure provides the method of any of the first through sixteenth aspects, in which the char yield of the bis-Schiff resin in the carbon-carbon composite is greater than 50%.

In an eighteenth aspect, the disclosure provides the method of any of the first through seventeenth aspects, in which the first elevated temperature and the third elevated temperature are substantially the same.

It should be apparent to those skilled in the art that various modifications and variations may be made to the embodiments described within without departing from the spirit and scope of the claimed subject matter. Thus, it is intended that the specification cover the modifications and variations of the various embodiments described within provided such modification and variations come within the scope of the appended claims and their equivalents.

As used throughout, the singular forms "a," "an" and "the" include plural referents unless the context clearly dictates otherwise. Thus, for example, reference to "a" component includes aspects having two or more such components, unless the context clearly indicates otherwise.

It should be understood that any two quantitative values assigned to a property or measurement may constitute a range of that property or measurement, and all combinations of ranges formed from all stated quantitative values of a given property or measurement are contemplated in this disclosure.

As used here and in the appended claims, the words "comprise," "has," and "include" and all grammatical variations thereof are each intended to have an open, non-limiting meaning that does not exclude additional elements or steps.

Having described the subject matter of the present disclosure in detail and by reference to specific embodiments thereof, it is noted that the various details disclosed within should not be taken to imply that these details relate to elements that are essential components of the various embodiments described within, even in cases where a particular element is illustrated in each of the drawings that accompany the present description. Further, it should be apparent that modifications and variations are possible without departing from the scope of the present disclosure, including, but not limited to, embodiments defined in the appended claims. More specifically, although some aspects of the present disclosure are identified as particularly advantageous, it is contemplated that the present disclosure is not necessarily limited to these aspects.

What is claimed is:

1. A method of making a carbon-carbon composite from thermosetting polymer resin comprising the steps of:

a) infusing bis-Schiff base resin into carbon fiber reinforcement to form an uncured resin embedded composite, the bis-Schiff base resin comprising the structure of Formula (I):

Formula (I)

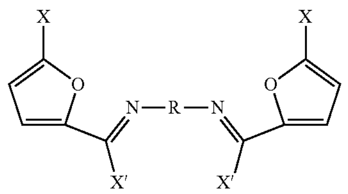

wherein:

R comprises at least one aromatic moiety,

X comprises an aromatic moiety, an aliphatic moiety, or a hydrogen and X' comprises an aromatic moiety, an aliphatic moiety, or a hydrogen;

b) positioning the resin embedded composite on a substrate under a vacuum enclosure;

c) curing the carbon fiber reinforcement embedded with bis-Schiff base resin at a first elevated temperature under vacuum to form a polymer matrix composite;

d) heating the polymer matrix composite at a second elevated temperature under inert atmosphere to form a porous carbon-carbon composite;

e) re-infusing bis-Schiff base resin into the porous carbon-carbon composite resulting from step (d) and curing the newly infused bis-Schiff base resin at a third elevated temperature to generate a reinfused porous carbon-carbon composite; and f) heating the reinfused porous composite resulting from step (e) at a fourth elevated temperature under inert gas to densify the resulting reinfused carbon-carbon composite from step (e) and form the carbon-carbon composite;

wherein the second elevated temperature and/or the fourth elevated temperature is less than 900° C.

2. The method of claim 1 wherein the carbon fiber reinforcement is unidirectional fibers, woven fabric, braided fabric, or 3D fiber preform.

3. The method of claim 1 wherein the resin embedded composite is a prepreg.

4. The method of claim 1 wherein the infusion step of step (a) and/or step (e) is conducted with a pressure differential between the composite and a source of the bis-Schiff base resin.

5. The method of claim 1 wherein the steps (e) and (f) are repeated 4 times or less for a total of 5 or less cycles.

6. The method of claim 5 wherein the carbon-carbon composite from step (f) is heated to a fifth temperature of 900° C. to 1800° C. on one or more of the cycles.

7. The method of claim 5 wherein the carbon-carbon composite from step (f) is heated to a fifth temperature of 1100° C. to 1700° C. on one or more of the cycles.

8. The method of claim 5 wherein the carbon-carbon composite from step (f) is heated to a fifth temperature of 1200° C. to 1600° C. on one or more of the cycles.

9. The method of claim 1 wherein the steps (e) and (f) are repeated 3 times or less for a total of 4 or less cycles.

10. The method of claim 1 wherein the steps (e) and (f) are repeated 2 times or less for a total of 3 or less cycles.

11. The method of claim 1 wherein the carbon-carbon composite from step (f) is heated to a fifth temperature of 900° C. to 1800° C.

12. The method of claim 1 wherein the carbon-carbon composite from step (f) is heated to a fifth temperature of 1100° C. to 1700° C.

13. The method of claim 1 wherein the carbon-carbon composite from step (f) is heated to a fifth temperature of 1200° C. to 1600° C.

14. The method of claim 1 wherein the bulk density of the carbon-carbon composite is greater than 1.6 g/cm3.

15. The method of claim 1, wherein the vacuum enclosure comprises a vacuum bag.

16. The method of claim 1, wherein the vacuum applied in step (c) is 25 inches of Hg or greater.

17. The method of claim 1, wherein the vacuum applied in step (e) is 25 inches of Hg or greater.

18. The method of claim 1, wherein the bis-Schiff base resin has a viscosity below 100,000 cP at 170° C.

19. The method of claim 1, wherein the char yield of the bis-Schiff resin in the carbon-carbon composite is greater than 50%.

20. The method of claim 1, wherein the first elevated temperature and the third elevated temperature are substantially the same.

* * * * *